(12) United States Patent
Kokkinos et al.

(10) Patent No.: US 6,382,090 B1
(45) Date of Patent: May 7, 2002

(54) HAND PRESS

(76) Inventors: Michael A. Kokkinos, P.O. Box 775, Carmel, CA (US) 93921; Hugo Bolders, Schotensteenweg 85 B, Brecht, Antwerp (BE), B 2960

( * ) Notice: Subject to any disclaimer, the term of this patent is extended or adjusted under 35 U.S.C. 154(b) by 0 days.

(21) Appl. No.: 09/977,156

(22) Filed: Oct. 12, 2001

(30) Foreign Application Priority Data

Oct. 23, 2000 (BE) .......................................... 2000/0688

(51) Int. Cl.$^7$ .......................... A47J 19/06; B30B 9/02; B30B 9/06; B30B 15/00
(52) U.S. Cl. .......................... 99/510; 99/495; 100/112; 100/125; 100/234
(58) Field of Search .......................... 99/495, 506–510, 99/511; 100/112, 125, 234, 99, 116, 243; 241/167, 169.1, 273.3, 169.2, 95; D7/665, 666

(56) References Cited

U.S. PATENT DOCUMENTS

| | | | | |
|---|---|---|---|---|
| 4,537,123 A | * | 8/1985 | Holcomb | 100/125 |
| 4,714,205 A | * | 12/1987 | Steinko | 241/95 |
| 5,101,720 A | * | 4/1992 | Bianchi | 100/99 |
| 5,165,335 A | * | 11/1992 | Bianchi | 100/112 |
| 5,303,640 A | * | 4/1994 | Gaber et al. | 99/495 |
| D350,261 S | * | 9/1994 | Ahner | D7/666 |
| 5,370,044 A | * | 12/1994 | Lackie | 100/234 |
| 5,463,941 A | * | 11/1995 | Gibson | 99/508 X |
| 5,467,699 A | * | 11/1995 | Laib | 99/495 |
| 5,513,562 A | * | 5/1996 | Moor | 100/112 |
| 5,520,104 A | * | 5/1996 | Ancona et al. | 99/495 |
| 5,791,237 A | * | 8/1998 | Gibson | 99/510 |
| 5,863,001 A | * | 1/1999 | Schulze | 241/169 |

* cited by examiner

Primary Examiner—Timothy F. Simone
(74) Attorney, Agent, or Firm—David E Newhouse, Esq.

(57) ABSTRACT

A kitchen hand press for crushing and extruding pulp, juices and oils from food items includes a stationary handle having a tub located at one end with sides, a distal end and a bottom with openings communicating through it, a pressing element forming a proximal end of the tub journaling and rotating about a shaft extending through the stationary handle; a large radius, ratchet-toothed, disc segment secured to and rotating with the pressing element; a pivoting handle pivotally secured to the stationary handle radially outward from the shaft having a ratchet, driving pin for engaging and rotating the ratchet-toothed disc segment rotating it and the pressing element into the tub upon pivotal rotation of the of the pivoting handle inward toward the stationary handle and ratcheting over the ratchet-toothed disc segment upon pivotal rotation of the pivoting handle outward away from the stationary handle; and via releasable ratchet, latching mechanism integral with the stationary handle for engaging and holding the ratchet-tooth disc segment stationary upon pivotal rotation of the pivoting handle away from the stationary handle, and releasing and ratcheting over the ratchet-tooth disc segment upon the disc segment being rotated by the pivoting handle pivoting toward the stationary handle.

12 Claims, 2 Drawing Sheets

HAND PRESS

RELATED APPLICATIONS AND PRIORITY CLAIMED

Pursuant 35 U.S.C. 119(a)–(d) or 365(b) the Applicants claim priority benefit of their related patent application Ser. No. 2000/0688 filed in Belgium on Oct. 23, 2000 for the subject matter disclosed and claimed.

BACKGROUND OF THE INVENTION

1. Field of the Invention

The invention is a kitchen hand tool specifically designed for crushing, pressing and extruding food items, in particular garlic cloves, to extract flowable pulp, essential juices and oils.

2. Description of the Prior Art

Food hand presses are used in the kitchen for pressing vegetables and fruit, in particular garlic. Known food presses typically include a pressing element fixed on a arm/handle pivotally-mounted on an edge of a tub located at the end of a stationary arm/handle having openings through its bottom. The garlic clove or other food item is placed in the tub, whereupon the operator grips the respective arms/handles of the press in one hand pivoting them together driving the pressing element into the tub crushing the garlic clove or food item against the tub bottom extruding it out through the bottom tub openings. The discouraging aspects of such typical hand food presses principally relate to: (i) the hand or grip strength required to fully crush and extrude the food item; (ii) the hand grip endurance required to maintain compression of resilient food items being crushed within the tub for extracting essential juices and oils; and (iii) hand grip fatigue when a large number of food items must be successively crushed.

SUMMARY OF THE INVENTION

The invented kitchen hand press for crushing and extruding pulp, juices and oils from food items includes (i) a stationary handle having a tub located at one end with sides, a distal end and a bottom with openings communicating through it, (ii) a pressing element forming a proximal end of the tub journaling and rotating about a shaft extending through the stationary handle; (iii) a large radius, ratchet-toothed, disc segment secured to and rotating with the pressing element; (iv) a pivoting handle pivotally secured to the stationary handle radially outward from the shaft having a ratchet, driving pin for engaging and the ratchet-toothed disc segment rotating it and the pressing element into the tub upon pivotal rotation of the pivoting handle inward toward the stationary handle and ratcheting over the ratchet-toothed disc segment upon pivotal rotation of the pivoting handle outward away from the stationary handle; and (v) a releasable ratchet, latching mechanism integral with the stationary handle for engaging and holding the ratchet-tooth disc segment stationary upon pivotal rotation of the pivoting handle away from the stationary handle, and releasing and ratcheting over the ratchet-tooth disc segment upon the disc segment being rotated by the pivoting handle pivoting toward the stationary handle.

The primary advantage of the invented kitchen hand food press relates to the mechanical advantage afforded by the combination of the relatively pivoting handles incrementally ratcheting, rotating a large radius disc segment and associated pressing element around the shaft into the tub substantially lessening hand grip strength required for efficient operation.

Another advantageous aspect of the invented kitchen hand food press relates to the inherent feature of a ratchet mechanism that engages and holds a rotational position. In particular, at any point of the crush, the ratchet mechanism holds the forward rotational position of the large radius ratchet-toothed disc segment relative to the stationary handle, enabling an operator to release his/her grip crushing the food item, without diminishing any compression of the food item confined within tub between the pressing element and the tub bottom.

Other features of the invented kitchen hand press for crushing and extruding pulp, juices and oils from food items relate to adjustable stops, which (a) determine the radians the ratchet toothed disc segment rotates per ratchet cycle, and opertatively establish a maximum crush position of the pressing element within the tube proximate the tub bottom. Releasing the releasable ratchet, latching mechanism integral with the stationary handle allows backward rotation of the disc segment and associated pressing element after the food item is completely, crushed and extruded to the maximum extent possible.

In order to better explain the characteristics of the invention, the following preferred embodiment of the invented kitchen hand press for crushing and extruding pulp, juices and oils from food items is illustrated and described as an example only, without being limitative in any way.

DESCRIPTION OF PREFERRED AND EXEMPLARY EMBODIMENTS

Figure 1:
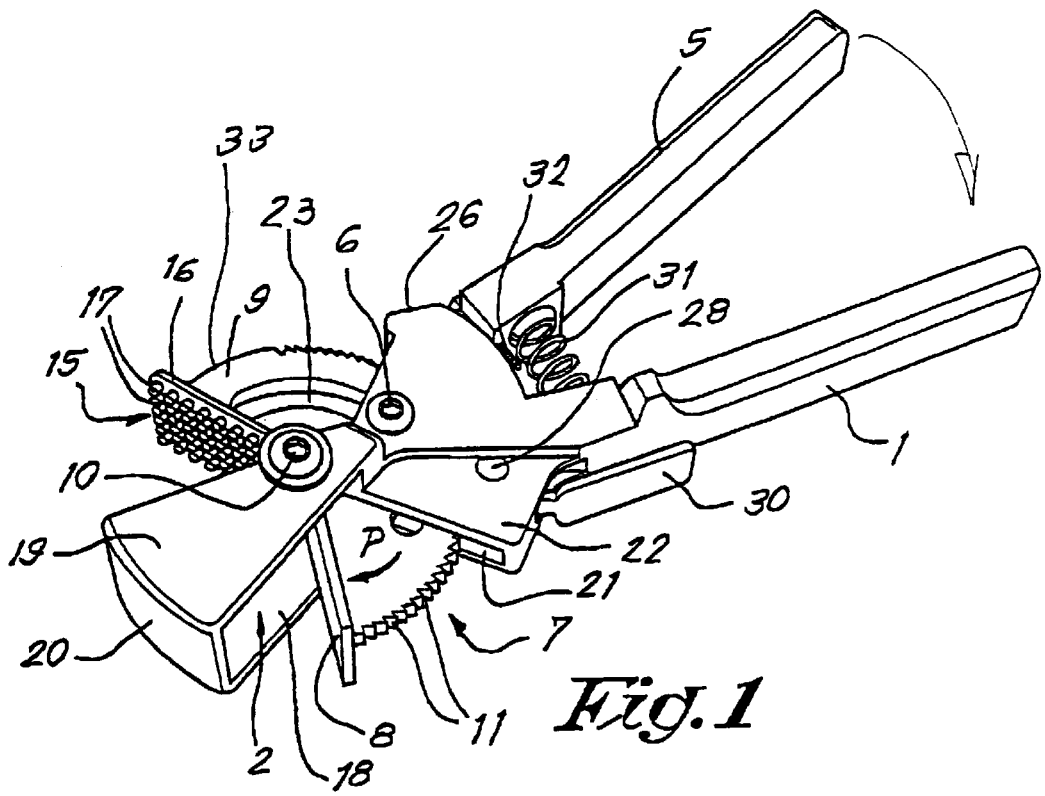
FIG. 1 represents a view in perspective of a kitchen food hand press according to the invention.

The invented kitchen hand press for crushing and extruding pulp, juices and oils from food items as represented in the figures mainly includes a stationary handle 1 with a tub 2 at one end. The tub 2 has side walls 18 & 19, a bottom 3 provided with openings 4, and a radially curved distal end wall 20. A pivoting handle 5 secured to the stationary handle 1 pivots on a hinge pin for operatively rotating a pressing element 8 journaling around a shaft 10 extending through the stationary handle toward the tub bottom 3 within the volume of the tub 2 via a ratchet mechanism 7. The pressing element 8 also functions as the proximal end wall of the tub 2 adjacent the shaft The ratchet mechanism 7 includes a disc segment 9 having a circumference slightly greater than a semicircle ($\pi$ radians or 180°), fastened to the pressing element 8 or similarly journaling and rotating around the shaft 10. Saw-tooth shaped or ratchet teeth 11 extend radially out the circumferential edge of the disc segment 9. A driving pin 12 mechanically coupled to the pivoting handle 5, and a locking pin 13 mechanically coupled to the stationary handle 1 co-operate with the ratchet teeth 11 for rotating the disc segment 9. As shown, the shaft 10 extends perpendicularly through stationary arm 1. A bushing 14 integral with the pressing element 8 journals around shaft 10 forming the proximate end wall for the tub 2. The disc segment 9, whether integral with or secured to the bushing 14, is rotatable with the bushing 14 around the shaft 10.

The pressing element 8 shown integral with the bushing 14 has the shape of a flat plate, and extends radially from the bushing 14 with its it back surface abutting a front radial edge of the disc segment 9. A similarly shaped punch element 15 shown integral with the bushing 14 extends oppositely radially from the bushing 14 with its back surface abutting a rear radial edge of the disc segment 9. The punch element 15 presents a flat surface 16 with protrusions 17 positioned to be received in corresponding openings 4 communicating through the tub bottom 3.

The size and shape of the pressing element 8 and the punch element 15 correspond in size and shape with the tub bottom 3. Accordingly, upon rotation of bushing 14 and disc segment 9 in a forward pressing direction P, the pressing element 8 forms a moving wall within the volume of the tub 2 defined by its bottom 3, its two parallel side walls 18 and 19 and a radially curve distal end wall 20. The radius of curvature of distal end wall 20 is concentric with shaft 10.

In more detail, the disc segment 9 rotates within a cavity 21 of a yoke 22 formed through the stationary arm 1 connecting with the tub 2. A circumferential slot 23 is cut through the disc segment 9 for accommodating the hinge pin 6 fastened between the walls of the yoke 22. The hinge pin pivotally secures the pivoting handle 5 to the stationary arm 1 within the yoke cavity 21.

The driving pin 12 is mechanically coupled to the pivoting handle 5 by a shaft 24 and pivots inside the yoke cavity 21. A spring 25 biases the driving pin to normally engage the ratchet teeth 11 on the circumferential edge of disc segment 9. An adjustable stop 27 located at the base 26 of the yoke 22 within the yoke cavity 21 mechanically co-operates with pivoting driving pin 12 to pivot the driving pin 12 out of engagement with the ratchet teeth 11 against the action of the spring 25 when the pivoting handle 5 is pivoted to its outmost or open position within the yoke cavity 21. The pivoting handle 5, in turn, is biased in a normally open position, by compression spring 31 (FIGS. 2 & 5) and in that position, the stop 27 maintains the driving pin 12 in the disengaged position.

A releasable locking pin 13 is mechanically coupled to the stationary arm 1 by a shaft 28 and also pivots inside the yoke cavity 21. A spring 29 biases the locking pin 13 to normally engage the ratchet teeth 11, for preventing backward rotation (opposite to direction P) of the disc segment 9 and associated bushing 14 carrying the pressing and punch elements 8 and 15. The locking pin includes a release arm 30 extending out the yoke cavity 21 along the stationary arm 1 for operatively pivoting, mechanically disengaging the locking pin 31 out engagement with the ratchet teeth 11 against the action of the spring 29. The ratchet teeth 11 are shaped and oriented such that the locking pin 13 moves or ratchets over them as the disc segment 9 and associated bushing 14, pressing and punch elements 8 & 15 are rotated in the pressing direction P (indicated by arrow P in FIGS. 1 and 2).

A stop 32 screwing into the pivoting handle 5 is adjustable to establish the closed position of the pivoting handle pivoting toward the stationary arm against the action of the compression spring 31 biasing the pivoting handle 5 in the open position.

Preferably the entire hand press is fabricated with stainless steel components. However a combination of components of stainless steel, cast iron, and cast aluminum, and high strength structural(molded) plastics and the like are also feasible.

Figure 2:
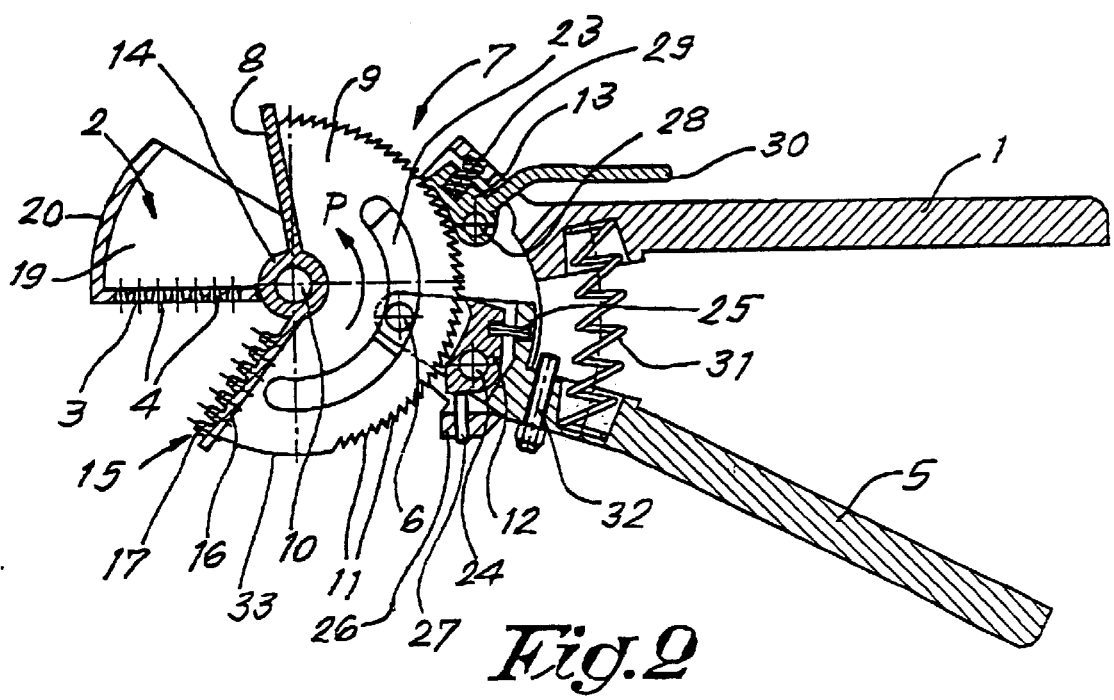
FIG. 2 represents a longitudinal section of the hand press from FIG. 1.
Figure 3:
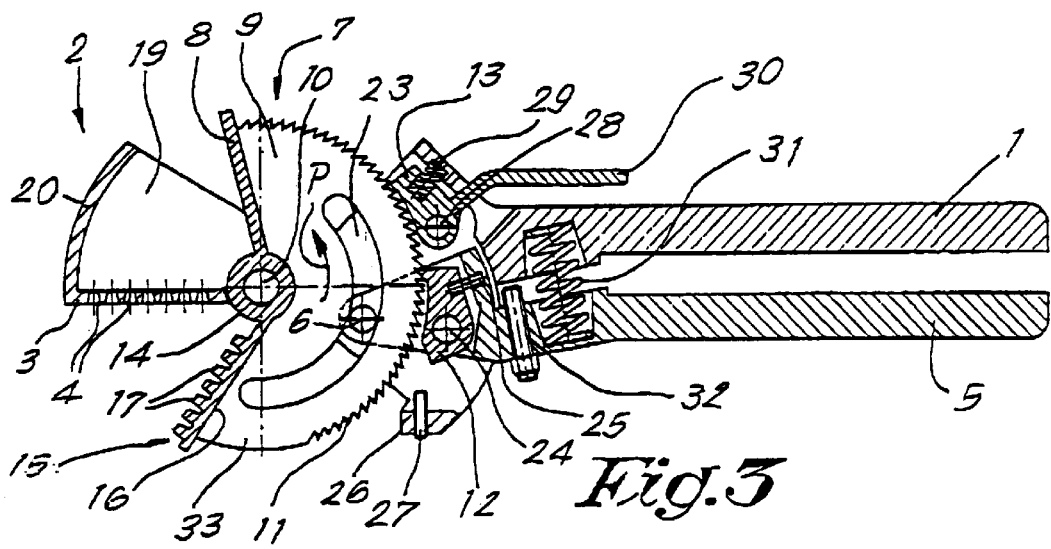
FIGS. 3 to 5 represent sections analogous to those in FIG. 2, at different operational positions, respectively.
Figure 5:
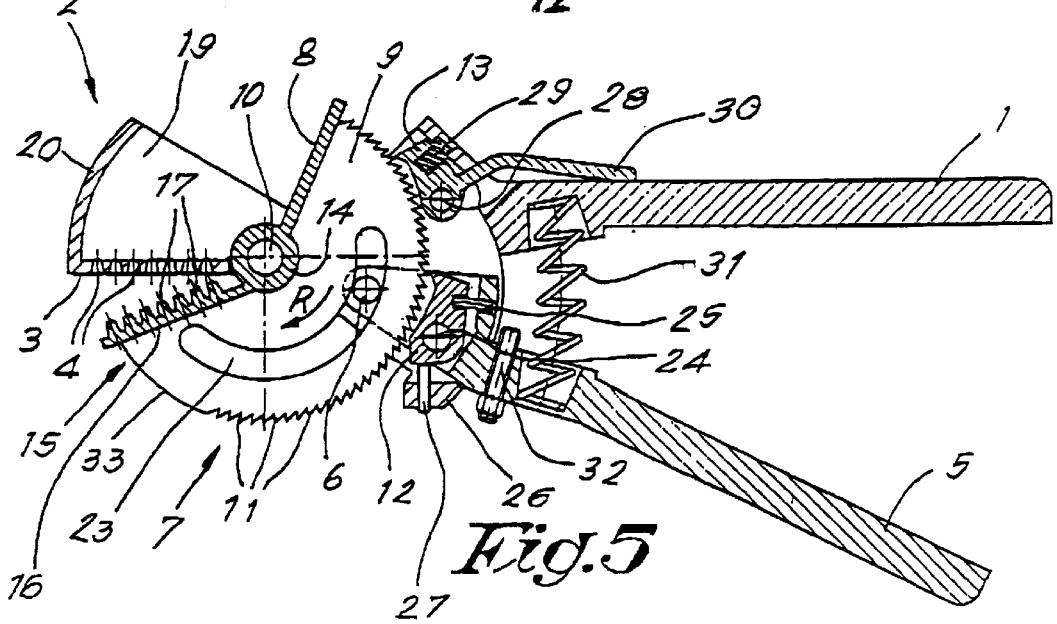

The invented hand press is operated by gripping the stationary and pivoting handles 1 and 5 in one's hand and providing sufficient torque for pivoting the pivoting handle 5 from the open position to the closed position. In particular, the stationary handle 1 and pivoting handle 5 are normally biased in the open position away from one another by compression spring 31 as shown in FIGS. 1, 2 & 5. In the open position, driving pin 12 is pivoted out of engagement with the ratchet teeth 11 on the circumferential edge of the disc segment 9 by the stop 27. A clove of garlic, or other piece of fruit/vegetable/nut is placed in the tub 2. The pressing element 8 is pushed by hand against the garlic clove within the tub 2 rotating the disc segment 9 in the forward or pressing direction P. The normally engaged locking pin 13 prevents the disc segment 9 from rotating in the opposite or backward sense preventing the clove or food piece from falling out of the tub 2. Then grasping the stationary and pivoting handles 1 & 5 in one hand, the pivoting handle 5 is successively pivoted from the open position to the closed position adjacent the stationary handle 1 moving the pressing element 8 toward the tub bottom 3 crushing and extruding pulp, juices and oils of the garlic clove or food item out the holes 4 communicating through the tub bottom 3. With each pivoting cycle of the pivoting handle 5 towards the stationary handle 1, the driving pin 12, responsive to the action of spring 25 engages the ratchet teeth 11 of the disc segment 9 to incrementally rotate it, the associated bushing 14 and pressing and punch elements 8 & 15 in the forward pressing direction P. FIG. 3, illustrates the invented the hand press with the pivoting handle 5 pivoted to the closed position adjacent to the stationary handle 1. The locking pin 13 prevents the disc segment 9 from rotating backward due to resilience of the piece of garlic or food item as the pivoting handle 5 pivots back to the open position responsive to the action of compression spring 25. Similar to the locking pin 13, the driving pin 12 ratchets over the ratchet teeth 11 of the disc segment 9 as the pivoting handle 5 pivots from the closed position to the open position. The incremental, gradual rotation of the disc segment 9 in the forward pressing direction P, moves the pressing element 8 into the tub 2 mashing the clove of garlic, or fruit/vegetable/nut against the tub bottom 3 extruding pulp, juice and oils through the openings 4.

Figure 4:
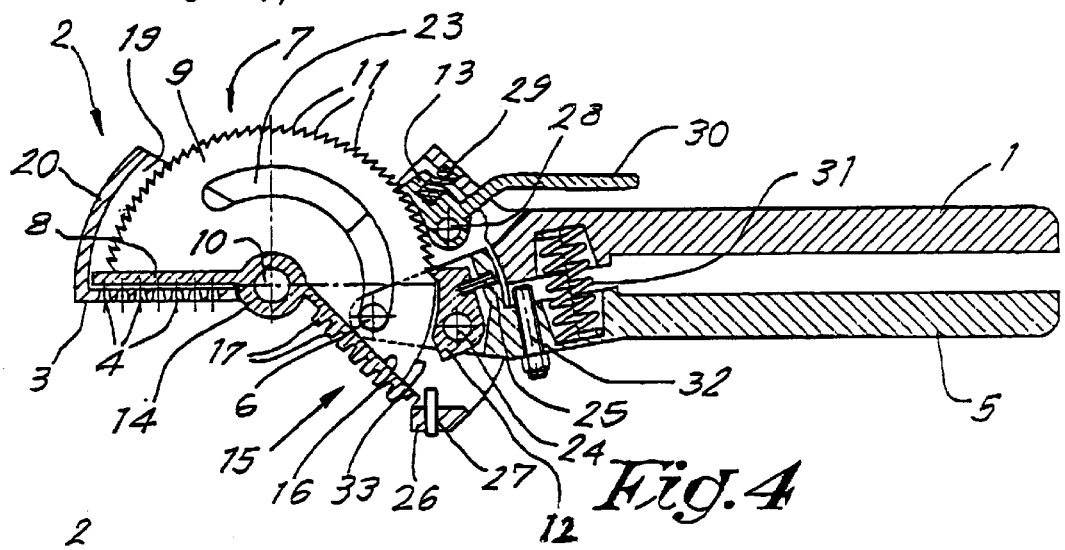

The angle, configuration and distribution of ratchet teeth 11 on the circumferential edge of the disc segment 9 are selected such that, upon releasing the pivoting handle 5, once the pressing element 8 reaches a predetermined maximum crush position proximate the inside surface of the tub bottom 3, the driving pin 12, moving with the pivoting handle 5 to the open position, reaches or registers with a rear section 33 on the circumference of the disc segment 9 without teeth 11. (See FIG. 4) The absence of ratchet teeth 11 in rear section 33 assures no further forward rotation of the disc segment 9 in the forward pressing direction P, beyond that maximum crush position. However, as those experienced with extrusion of fibrous food products should realize, in most cases, even with garlic cloves, there will usually be some residue, that effectively precludes the pressing element 8 from reaching the predetermined maximum crush position. Accordingly, as the maximum crush position is approached, the driving pin will continue to engage the rearmost ratchet teeth 11 on the disc segment 9 until the resistance presented by the food residue exceeds the torque applied opposite the pivot (shaft 10) by the operator gripping the two handles 1 & 5 attempting to pivot the pivoting handle 5 to the closed position.

To prevent bending or breaking of the components of the invented hand press, adjustable stop 32 is located and adjustable relative to the circumferential length of rear section 33 on the circumference of the disc segment 9 without teeth 11 beyond the rear most ratchet tooth, to establish a maximum crush position of the pressing element 8 within the tub 2 to accommodate non-flowable residues of particular food items.

Upon the pressing element 8 being rotated to the maximum crush position, locking pin 13 engages the ratchet teeth 11 on the disc segment 9 to maintain that position compressing the non-extrudable residue of the food item between the pressing element 8 and the tub bottom 3. As those skilled in food preparation arts understand, much of the flavor essences of food items are in oils and juices that gradually seep from compressed, crushed pulp, and accordingly, will appreciate the inherent feature of the described ratchet mechanism of the invented kitchen hand press, in particular, the releasable latching or locking pin 13 the which allows an operator to release his or her hand grip providing the torque pivoting the pivoting handle 5 toward the stationary arm 1 at any point of the crush without diminishing any compression of the not yet-extruded crushed food pulp confined within the tub 2. The inherent elasticity/resilience of the crushed and compressed food pulp confined in the available volume of the tub 2 at any point of the crush continues to provide pressure necessary to cause essential juices and oils to seep from the pulp out the holes 4 through the tub bottom 3. In fact, food pulp crushed and compressed within the tub of the invented hand press can be left for periods of time as may be necessary to allow the essential juices and oils to seep out.

As previously described, when the operator releases his or her grip, pivoting handle 5 pivots outward to the open position responsive to action of compression spring 31, where stop 27 pivots driving pin 12 out of engagement with the ratchet teeth 11 on the circumferential edge of the disc segment 9. Locking pin 13 engaging ratchet teeth 11, holds the forward most position of disc segment 9 confining the compressed food pulp in the tub 2. Pressing release lever 30 pivots locking pin 13 outward, disengaging engagement with ratchet teeth 11 allowing backward rotation of disc segment 9 and associated bushing 14, pressing element 8, and punch element 15. Then by either grasping the disc segment 9 or pushing the punch element 15 with one's hand and or thumb, the disc segment 9 is rotated backwards indicated by arrow R in FIG. 5 pushing protrusions 17 extending out the punch element 15 into the openings 4 through the bottom 3 of the tub 2. Protrusions 17 in turn push any food remaining in the openings 4 into the tub interior where same can be easily washed out.

Adjustable stops 27 and 32 also determine the open and closed positions of pivoting handle 5 relative to stationary handle 1, hence the number of ratchet teeth 11 between the open and closed position. The lower the number of ratchet teeth 11 of disc segment 9 moved per pivoting movement of the handles 1 and 5 from the open to the closed position, the smaller the incremental rotation of the disc segment 9 per cycle moving the pressing element 8 in the forward pressing direction P toward the tub bottom 3.

Mechanical advantage provided by the relatively pivoting handles 1 and 5 and by the ratio of the radius of disc segment 9 to the effective length of the tub on the opposite sides of shaft 10 (providing a pivot) increases the force of one's hand grip for pressing and crushing a food item against the tub bottom 3 extruding it through the openings 4. In particular, hinge pin 6 on which pivoting handle 5 pivots should be situated at a distance from the shaft 10 to assure sufficient mechanical advantage so that small hand gripping torques closing the stationary and pivoting handles 1 and 5 together, provide adequate forces opposite the pivot (shaft 10) between the tub bottom 3 and pressing element 8 to crush and extrude the food item out through the holes 4. In fact, as the skilled mechanical designer should recognize, it is possible to provide the invented kitchen hand press with sufficient mechanical advantage to crush and extrude any flowable food material placed in the tub, almost to the last drop, including pulp, juices, and oils not only from garlic cloves, but also fruits, vegetables, herbs, nuts and seeds.

The invention is by no means limited to the above described embodiment illustrated in the accompanying drawings; on the contrary, such a hand press can be made in all sorts of variants while still remaining within the scope of the following claims.

We claim:

1. A kitchen hand press for pressing pieces of food comprising in combination,
   a) a stationary handle having a tub at one end with sides, a distal end wall and a bottom having openings communicating through it,
   b) a pressing element forming a proximal end wall to the tub journaling and rotating about a shaft extending through the stationary handle defining a journal axis, the pressing element rotating toward and away from the bottom of the tub,
   c) a ratchet-toothed disc segment rotating with the pressing element about the shaft,
   d) a pivoting handle pivotally secured to the stationary handle radially outward from the journal axis having a driving pin for engaging and rotating the ratchet-toothed disc segment rotating it and the pressing element into the tub upon pivotal rotation of the of the pivoting handle inward toward the stationary handle to a closed position, and resiliently releasing and ratcheting over the ratchet-toothed disc segment upon pivotal rotation of the pivoting handle outward away from the stationary handle to an open position, and
   f) a releasable ratchet latching mechanism integral with the stationary handle for engaging and holding the ratchet-tooth disc segment stationary upon pivotal rotation of the pivoting handle away from the stationary handle to an open position, and releasing and ratcheting over the ratchet-tooth disc segment upon the disc segment being rotated by the pivoting handle pivoting toward the stationary handle to the closed position.

2. The kitchen hand press according to claim 1 wherein the ratchet-toothed disc segment has a circumferential edge greater than $\pi/2$ radians (90°) and less than $\pi$ radians (180°) around.

3. The kitchen hand press according to claim 1 wherein the ratchet-toothed disc segment has a circumferential edge greater than $\pi$ radians (180°) and less than $1.5\ \pi$ radians (270°) around.

4. The kitchen hand press according to claim 2 or 3 wherein the ratchet-toothed disc segment has ratchet teeth extending radially outward from its circumferential edge.

5. The kitchen hand press according claim 4, wherein the pressing element has a size and shape that conforms to that of the bottom of the tub for snuggly being received within the tub.

6. The kitchen hand press according to claim 4 wherein the distal end wall of the tub is curved having an axis of curvature concentric with the journal axis.

7. The kitchen hand press according to claim 4 wherein the stationary handle has a yoke structure extending from the tub for accommodating rotation of the ratchet-toothed disc segment secured to the pressing element.

8. The kitchen hand press according to claim 7 wherein a hinge pin pivotally secures a proximate end of the pivoting handle within the yoke structure, and the ratchet-tooth disk segment has a circumferential slot radially inward from its circumferential edge for accommodating the hinge pin permitting rotation of the pressing element, and attached ratchet-tooth disk segment about the journal axis.

9. The kitchen hand press according to claim 8 wherein the pressing element further includes a pressing surface and a cleaning surface, the pressing surface rotating with a forward radial edge of the ratchet-toothed disc segment toward and away from the bottom of the tub within the tub, the cleaning surface rotating with a backward radial edge of the ratchet-toothed disc segment toward and away from the bottom of the tub outside the tub, and wherein the cleaning surface has an array of protrusions positioned and shaped for receipt in the openings communicating through the tub bottom.

10. The kitchen hand press according to claim 8 and further including a compression spring disposed for biasing the stationary and pivoting handles normally apart in the open position.

11. The kitchen hand press according to claim 10 wherein the stationary handle includes an open-position, adjustable stop within the yoke structure and the pivoting handle includes a closed-position, adjustable stop, such open- and closed position adjustable stops adjusting radians the ratchet toothed disc segment rotates upon pivoting the pivoting handle from the open position to the closed position, the open-position, adjustable stop also operatively engaging the driving pin disengaging its engagement with the ratchet teeth of the disc segment at the open position.

12. The kitchen hand press of claim 11 wherein the ratchet toothed disc segment includes a rear section with a smooth circumferential edge extending from a back radial edge having a circumferential length determining, in cooperation with the open- and closed-position adjustable stops, a maximum crush position of a pressing surface of the pressing element within and proximate to the bottom of the tub.

\* \* \* \* \*